July 26, 1955      J. CAYZAC      2,714,191

AMPLITUDE-MODULATION SYSTEM FOR ULTRA-HIGH FREQUENCIES

Filed Oct. 1, 1952      2 Sheets-Sheet 1

INVENTOR
JACQUES CAYZAQ
BY
AGENT

July 26, 1955 J. CAYZAC 2,714,191
AMPLITUDE-MODULATION SYSTEM FOR ULTRA-HIGH FREQUENCIES
Filed Oct. 1, 1952 2 Sheets-Sheet 2

INVENTOR
JACQUES CAYZAQ
BY Fred M Vogel
AGENT

United States Patent Office 2,714,191
Patented July 26, 1955

2,714,191

AMPLITUDE-MODULATION SYSTEM FOR ULTRA-HIGH FREQUENCIES

Jacques Cayzac, St. Hilaire, France, assignor to Hartford National Bank and Trust Company, Hartford, Conn., as trustee Application October 1, 1952, Serial No. 312,521

Claims priority, application France October 19, 1951

4 Claims. (Cl. 332—51)

This invention relates to an electromagnetic device for amplitude-modulation of a high-frequency wave passing through a wave-guide with a frequency exceeding the natural gyro-magnetic resonance frequency of a substantially non-conductive ferromagnetic member incorporated in the device, which member is subject to a modulating pre-magnetising field to introduce a variable damping of the high-frequency wave. The term amplitude-modulation is here to be understood to mean any modification of the amplitude due to variation of the pre-magnetising field.

The invention has for its object to provide a particular form of such a device, which is eminently suitable for wavelengths in the proximity of 10 cms.

In accordance with the invention, the wave-guide is coupled to at least one short co-axial wave-guide whose inner conductor constitutes a probe within the wave-guide said inner conductor being connected to the outer conductor in the form of a loop around the said member.

The steps taken according to the invention yield inter alia the advantage that the heat evolved by the high-frequency energy in the modulator, more particularly in the ferromagnetic member, does not adversely affect the modulation-efficiency.

In order that the invention may be readily carried into effect, it will now be described with reference to the accompanying drawings, given by way of example, in which Fig. 1 shows diagrammatically one form of a modulation device incorporating the invention.

In the drawings, corresponding elements are provided with the same reference numerals.

Figure 1:
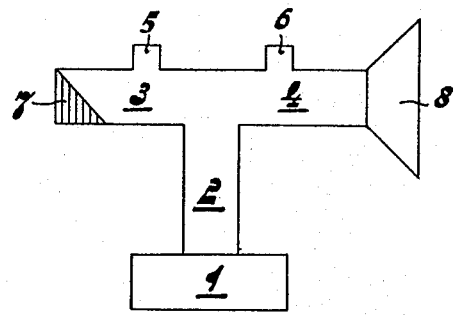

In Fig. 1, the ultra-high-frequency generator 1 feeds the middle branch 2 of a T-shaped wave-guide which also comprises side branches 3 and 4. The latter branches comprise modulators 5 and 6 respectively which are controlled in anti-phase. The branch 3 terminates in a matched load 7 and the branch 4 terminates in a transmitting aerial 8.

Modulation causes variations of the circuit-quality of the cavity resonators constituted by the modulators 5 and 6, hence variations of the impedance of branches 3 and 4 to the effect of reflecting a variable part of the energy in the side branches 3 and 4 respectively, the other part being absorbed by the real component of the impedances 7 and 8 respectively. Notwithstanding said variable reflection coefficients the combination of the variable impedances constituted by the side branches 3 and 4 has in practice been found to be such that branch 2 is loaded by a substantially constant matched impedance, it is, in effect so adjusted as to correspond exactly with the propagation of the travelling wave of generator 1 so that substantially no frequency- or phase-shift occurs after said wave.

Figure 2:
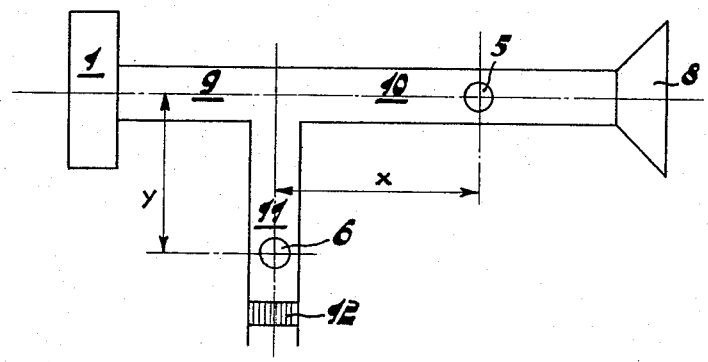
Fig. 2 shows a different form of such a device.

In Fig. 2, the end of one side branch 9 of the T is fed by the ultra-high frequency generator 1. The modulator 5 is coupled to the other side branch 10 terminating at the aerial 8 and the modulator 6 is coupled to the middle branch 11 of the T. The modulator 5 produces a variable impedance in the waveguide 9, 10 connecting the generator 1 to the aerial 8. In the absence of modulator 6 variations would be produced in the frequency or in the phase of the transmitted wave. However, the modulator 6 whose modulation current is displaced in phase by 180° relatively to that of the modulator 5 introduces for the generator 1 the complement of said variable impedance and consequently compensates the variations of the load impedance of the generator 1, hence if its frequency, the degree of adaptation being adjustable by means of a piston 12.

Figure 3:
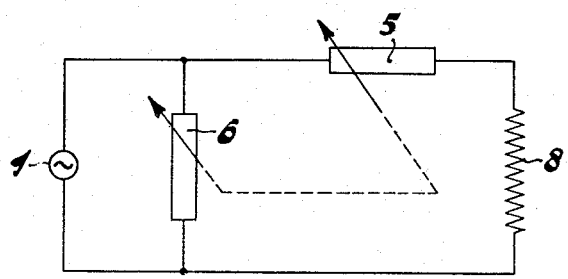
Fig. 3 is an equivalent network diagram for any one of the aforesaid devices.

Both circuit-arrangements are electrically equivalent as may be seen from the equivalent network diagram shown in Fig. 3 where the modulators 5 and 6 are represented by impedances 5 and 6 which vary in senses during the modulation cycle.

Figure 4:
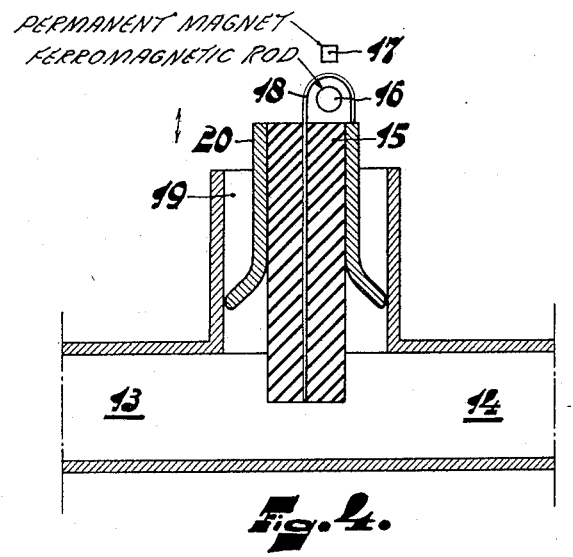
Fig. 4 is a sectional detail view of one form of a modulator according to the invention.

The modulator proper is shown in Fig. 4. According thereto the wave-guide 13, 14, which is postulated to have a rectangular section, has at its short side an aperture, for example circular, at which opens a duct 19, for example in the form of a cylinder. A hollow piston 20, which is movable in the said duct, constitutes the envelope of a co-axial conductor whose inner conductor 18, which is insulated by the dielectric 15, extends further inwardly beyond the plane of the conductor wall and constitutes a variable probe within the wave guide 13, 14. The conductor 18 is curved in the form of a loop at the end of the co-axial conductor remote from the wave guide 13–14 and soldered to the wall of the piston 20 thus forming a turn through which is slipped a threaded rod 16 consisting of ferromagnetic material.

Figure 5:
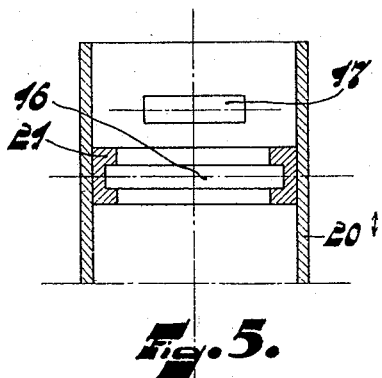
Fig. 5 is another section of the device shown in Fig. 4.
Figure 6:
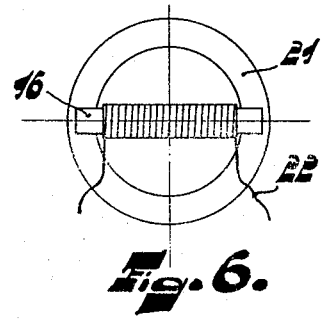
Fig. 6 is a plan view of this device.

Figs. 5 and 6 show in front view and in plan view respectively the details of this part of the modulation device. As may be seen from these figures, the rod 16 is secured in an insulating ring 21 and furnished with a modulation winding 22.

The rod 16 is permanently pre-magnetised by means of a permanent magnet 17 for adjustment to a minimum degree of modulation distortion.

In the said arrangements, the length and the position of the co-axial conductor 18—20, as well as the depth of penetration of the probe 18 into the conductor 13, 14 have been determined experimentally in accordance with the frequeny of the wave to be transmitted. The same holds for the arrangement of the modulator 5 on the conductor portion 10 in Fig. 2 and of the modulator 6 and piston 12 on the conductor portion 11.

The dimensions are so chosen as to obtain a modulation which is as deep and linear as possible, the frequency deviation being well-nigh suppressed.

In practice it has been found that in this manner propagation in the proximity of the generator is substantially free from reflection.

In this respect, experience shows, it is advantageous to use the following values: for the distance $x$ in Fig. 2 a value of about $\lambda/8$ or $3\lambda/8$ (the first-mentioned value is more advantageous) and for the distance $y$ a value between $1\lambda/8$ and $1.5\lambda/8$.

When moreover, the loss of energy is to be reduced in the modulator 6 shown in Fig. 2, the distance $y$ should be increased by $\lambda/4$ or, in general, by $n.\lambda/4$, $n$ being a whole number.

The invention is not limited to the type of modulator as described above. Thus, for example, the cross-section of the co-axial guide constituting the modulation member need not necessarily be circular, since a rectangular cross-section may sometimes be advantageous, the inner conductor then consisting of a band whose end loop surrounds the rod of ferromagentic material over a greater distance. In addition, the form, nature and, in short, the mode of construction and of connecting the various members (notably the piston 20 in Fig. 4) are without significance with respect to the essentials of the invention. If required, a suitable impedance transformer may be used at the input and/or the output of the whole modulator system.

What I claim is:

1. An electromagnetic device for amplitude modulation of a given high-frequency wave passing through a main wave-guide, said device comprising a non-conductive ferromagnetic member having a natural gyro-magnetic resonance frequency which is less than that of said given high-frequency wave, means coupled to said member to produce a pre-magnetized modulating field variably to damp the given high-frequency wave, and a co-axial stub wave-guide coupled to said main wave-guide and comprising an outer conductor and an inner conductor one end of which constitutes a probe penetrating into said first wave-guide, the other end of said inner conductor being looped about said member and terminating in a connection to said outer conductor.

2. A device, as set forth in claim 1, wherein said main guide is provided with a branch tube and wherein said co-axial stub wave-guide is adjustably fitted in said branch tube for adjusting the depth to which said inner conductor penetrates into said first wave-guide.

3. A device, as set forth in claim 1, wherein said main wave-guide is T-shaped to define three sections and wherein two of said co-axial wave-guides having impedances modulated in counterphase are inserted in respective sections.

4. A device, as set forth in claim 3, wherein one of said co-axial wave-guides is housed in a side section of said T-shaped wave-guide and wherein the other of said co-axial wave-guides is housed in the middle section thereof, said one wave-guide being disposed at a distance between $\lambda/8$ or $3\lambda/8$ from the intersection of the axes of said T-shaped wave-guide and said other wave-guide being disposed at a distance between $1\lambda/8$ and $1.5\lambda/8$ from said intersection, plus $n\lambda/4$ where $n$ is a whole number including zero.

References Cited in the file of this patent

UNITED STATES PATENTS

| | | |
|---|---|---|
| 2,286,428 | Mehler | June 16, 1942 |
| 2,488,370 | Boelens et al. | Nov. 15, 1949 |
| 2,545,994 | Gabler et al. | Mar. 20, 1951 |
| 2,547,159 | Guenard | Apr. 3, 1951 |
| 2,645,758 | Lindt | July 14, 1953 |